US005633291A

United States Patent [19]

Dyer et al.

[11] Patent Number: 5,633,291
[45] Date of Patent: May 27, 1997

[54] USE OF FOAM MATERIALS DERIVED FROM HIGH INTERNAL PHASE EMULSIONS FOR INSULATION

[75] Inventors: John C. Dyer; Thomas A. DesMarais, both of Cincinnati, Ohio

[73] Assignee: The Procter & Gamble Company, Cincinnati, Ohio

[21] Appl. No.: 472,447

[22] Filed: Jun. 7, 1995

[51] Int. Cl.$^6$ ............................................... C08J 9/28
[52] U.S. Cl. .................. 521/64; 521/146; 521/149; 521/63
[58] Field of Search ........................ 521/64, 146, 149, 521/63

[56] References Cited

U.S. PATENT DOCUMENTS

| | | | |
|---|---|---|---|
| 3,255,127 | 6/1966 | von Bonin et al. | 260/2.5 |
| 3,256,219 | 6/1966 | Will | 260/2.5 |
| 3,431,911 | 3/1969 | Meisel, Jr. | 128/287 |
| 3,563,243 | 2/1971 | Lindquist | 128/287 |
| 3,565,817 | 2/1971 | Lissant | 252/312 |
| 3,640,753 | 2/1972 | Krauch et al. | 117/62.2 |
| 3,734,867 | 5/1973 | Will | 260/2.5 R |
| 3,763,056 | 10/1973 | Will | 260/2.5 L |
| 3,778,390 | 12/1973 | Ulrich, Jr. | 260/2.5 AN |
| 3,806,474 | 4/1974 | Blair | 260/2.5 AG |
| 3,988,508 | 10/1976 | Lissant | 526/344 |
| 3,993,074 | 11/1976 | Murray et al. | 128/286 |
| 3,994,298 | 11/1976 | DesMarais | 128/285 |
| 4,029,100 | 6/1977 | Karami | 128/284 |
| 4,049,592 | 9/1977 | Marans et al. | 260/2.5 AD |
| 4,061,145 | 12/1977 | DesMarais | 128/275 |
| 4,067,832 | 1/1978 | DesMarais | 260/2.5 AB |
| 4,093,570 | 6/1978 | Miyake et al. | 260/2.5 B |
| 4,110,276 | 8/1978 | DesMarais | 521/123 |
| 4,132,839 | 1/1979 | Marans et al. | 521/159 |
| 4,262,052 | 4/1981 | Kannan et al. | 428/306 |
| 4,376,440 | 3/1983 | Whitehead et al. | 604/387 |
| 4,394,930 | 7/1983 | Korpman | 220/444 |
| 4,425,130 | 1/1984 | DesMarais | 604/389 |
| 4,473,611 | 9/1984 | Haq | 428/198 |
| 4,522,953 | 6/1985 | Barby et al. | 521/64 |
| 4,536,521 | 8/1985 | Haq | 521/146 |
| 4,540,717 | 9/1985 | Mahnke et al. | 521/52 |
| 4,554,297 | 11/1985 | Dabi | 521/178 |
| 4,603,069 | 7/1986 | Haq et al. | 428/76 |
| 4,606,958 | 8/1986 | Haq et al. | 428/68 |
| 4,611,014 | 9/1986 | Jones et al. | 521/146 |
| 4,612,334 | 9/1986 | Jones et al. | 521/146 |
| 4,613,543 | 9/1986 | Dabi | 428/304.4 |
| 4,668,709 | 5/1987 | Jones et al. | 521/146 |
| 4,724,242 | 2/1988 | Vassileff | 521/83 |
| 4,725,628 | 2/1988 | Garvey et al. | 521/137 |
| 4,731,391 | 3/1988 | Garvey | 521/137 |
| 4,740,528 | 4/1988 | Garvey et al. | 521/128 |
| 4,775,655 | 10/1988 | Edwards et al. | 502/416 |
| 4,788,225 | 11/1988 | Edwards et al. | 521/147 |
| 4,797,310 | 1/1989 | Barby et al. | 428/71 |
| 4,839,395 | 6/1989 | Masamizu et al. | 521/56 |
| 4,957,810 | 9/1990 | Eleouet et al. | 428/306.6 |
| 4,959,341 | 9/1990 | Wallach | 502/404 |
| 4,961,982 | 10/1990 | Taylor | 428/41 |
| 4,965,289 | 10/1990 | Sherrington et al. | 521/53 |
| 4,966,919 | 10/1990 | Williams, Jr. et al. | 521/54 |
| 4,972,002 | 11/1990 | Volkert | 521/120 |
| 4,973,610 | 11/1990 | Hahn et al. | 521/89 |
| 4,985,467 | 1/1991 | Kelly et al. | 521/52 |

(List continued on next page.)

FOREIGN PATENT DOCUMENTS

| | | |
|---|---|---|
| 0017671A1 | 10/1980 | European Pat. Off. . |
| 0017672A1 | 10/1980 | European Pat. Off. . |
| 0049768A1 | 4/1982 | European Pat. Off. . |
| 0068830A1 | 1/1983 | European Pat. Off. . |
| 0299762 | 1/1989 | European Pat. Off. . |
| 0480379A2 | 4/1992 | European Pat. Off. . |
| 1340520 | 9/1963 | France . |
| 3109929A1 | 1/1982 | Germany . |
| 2-239863 | 9/1990 | Japan . |
| 2-289608 | 11/1990 | Japan . |
| 3-49759 | 3/1991 | Japan . |
| 1493356 | 11/1977 | United Kingdom . |
| 2188055A | 9/1987 | United Kingdom . |
| WO94/28839 | 12/1994 | WIPO . |

OTHER PUBLICATIONS

Lissant, KJ et al., "Structure of High Internal Phase Ratio Emulsions", 47(2) *J. of Colloid and Interface Sci.* 416 23, May 1974.

Lissant, KJ et al., "A Study of Medium and High Internal Phase Ratio Water/Polymer Emulsions", 42(1) *J. of Colloid and Interface Sci.* 201–08, 1973.

Lissant, KJ et al., "The Geometry of High–Internal–Phase Ratio Emulsions", 22 *J. of Colloid and Interface Sci.* 462–68, 1966.

Aubert, JH et al., "Low Density, Microcellular Polystyrene Foams," 26 *Polymer* 2047–54, 1985.

(List continued on next page.)

*Primary Examiner*—Morton Foelak
*Attorney, Agent, or Firm*—Carl J. Roof; E. Kelly Linman; Jacobus C. Rasser

[57] ABSTRACT

The invention relates to the use of polymeric foam materials for insulation. These polymeric foams are prepared by polymerization of certain water-in-oil emulsions having a relatively high ratio of water phase to oil phase, commonly known in the art as high internal phase emulstions, or "HIPEs." The HIPE-derived foam materials used in the present invention comprise a generally hydrophobic, flexible, semi-flexible, or rigid nonionic polymeric foam structure of interconnected open-cells. These foam structures have:

A) a specific surface area per foam volume of at least about 0.01 m$^2$/cc;

B) a density of less than about 0.05 g/cc; and

C) a glass transition temperature (Tg) of between about −20° and 90° C.

The foams can be used as thermal, acoustic, and/or mechanical insulation materials.

In a preferred embodiment, the foams used can be prepared, packaged, and shipped in a compressed, high density state and will "spring back" upon activation (e.g. heat) to the original density of the foam.

11 Claims, 2 Drawing Sheets

U.S. PATENT DOCUMENTS

| | | | |
|---|---|---|---|
| 4,985,468 | 1/1991 | Elmes et al. | 521/63 |
| 4,990,541 | 2/1991 | Nielsen et al. | 521/70 |
| 4,992,254 | 2/1991 | Kong | 423/449 |
| 5,021,462 | 6/1991 | Elmes et al. | 521/63 |
| 5,034,424 | 7/1991 | Wenning et al. | 521/109.1 |
| 5,037,859 | 8/1991 | Williams, Jr. et al. | 521/55 |
| 5,047,225 | 9/1991 | Kong | 423/447.2 |
| 5,065,752 | 11/1991 | Sessions et al. | 128/156 |
| 5,066,684 | 11/1991 | LeMay | 521/64 |
| 5,066,784 | 11/1991 | Sherrington et al. | 530/334 |
| 5,110,838 | 5/1992 | Tokiwa et al. | 521/81 |
| 5,116,880 | 5/1992 | Tokiwa et al. | 521/134 |
| 5,116,883 | 5/1992 | LeMay | 521/178 |
| 5,128,382 | 7/1992 | Elliott, Jr. et al. | 521/178 |
| 5,134,007 | 7/1992 | Reising et al. | 428/78 |
| 5,134,171 | 7/1992 | Hammel et al. | 521/98 |
| 5,147,345 | 9/1992 | Young et al. | 604/378 |
| 5,149,720 | 9/1992 | DesMarais et al. | 521/63 |
| 5,189,070 | 2/1993 | Brownscombe et al. | 521/64 |
| 5,198,472 | 3/1993 | DesMarais et al. | 521/63 |
| 5,200,433 | 4/1993 | Beshouri | 521/64 |
| 5,210,104 | 5/1993 | Bass et al. | 521/64 |
| 5,210,108 | 5/1993 | Spinu et al. | 521/182 |
| 5,221,726 | 6/1993 | Dabi et al. | 528/93 |
| 5,250,576 | 10/1993 | DesMarais et al. | 521/63 |
| 5,250,579 | 10/1993 | Smits et al. | 521/98 |
| 5,252,619 | 10/1993 | Brownscombe et al. | 521/64 |
| 5,260,345 | 11/1993 | DesMarais et al. | 521/148 |
| 5,268,224 | 12/1993 | DesMarais et al. | 428/286 |
| 5,276,067 | 1/1994 | Doerge | 521/131 |
| 5,290,820 | 3/1994 | Brownscombe et al. | 521/64 |
| 5,318,554 | 6/1994 | Young et al. | 604/378 |
| 5,331,015 | 7/1994 | DesMarais et al. | 521/62 |
| 5,336,208 | 8/1994 | Rosenbluth et al. | 604/329 |
| 5,336,695 | 8/1994 | Nass et al. | 521/109.1 |
| 5,352,711 | 10/1994 | DesMarais | 521/149 |
| 5,387,207 | 2/1995 | Dyer et al. | 604/369 |

OTHER PUBLICATIONS

LeMay, "Mechanical Structure Property Relationships of Microcellular, Low Density Foams", 207 *Mat. Res. So Symp. Proc.* 21–26, 1991.

Weber, H et al., "New Melamine–based elastic foam", translation of 75 *Kunststoffe German Plastics* 843–48, 1985.

Young, AT et al., "Preparation of multishell ICF target plastic foam cushion materials by thermally induced phase inversion processes", 20(4) *J. Vac. Sci Technol.* 1094–2004, 1981.

Gibson, LJ and Ashby, MF, "Cellular Solids Structure & Properties", Permagon Press, Chapter 5, pp. 121–200, 1988.

Aerogels, Jochen Fricke, pp. 92–97.

Blumgara, Z., "Polymeric Foam Materials as Filtration Media", *Filtration and Separation* (Mar. 1995), pp. 245–251.

Williams, JM, "High Internal Phase Water–In–Oil Emulsions: Influence of Surfactants and Cosurfactants on Emulsion Stability and Foam Quality", 7 *Langmuir* 1370–77, 1991.

Kong, FM, "Summary Abstract: Low–density polystyrene foam materials for direct–drive last inertial confinemen fusion targets", 6(3) *J. Vac. Sci. Tech.* 1894–1895, 1988.

Hainey, P et al., "Synthesis and Ultrastructural Studies of Styrene–Divinylbenzene Polyhipe Polymers", 24 *Macromolecules*, 117–121, 1991.

USE OF FOAM MATERIALS DERIVED FROM HIGH INTERNAL PHASE EMULSIONS FOR INSULATION

FIELD OF THE INVENTION

This application relates to the use of microporous, open-celled polymeric foam materials as insulation materials. The application particularly relates to the use of foam materials made from high internal phase emulsions.

BACKGROUND OF THE INVENTION

The development of efficient and effective insulating materials has been the subject of substantial commercial interest. This is particularly true for materials which are thermal insulators, e.g. which reduce the rate of heat loss (or gain) of any device, construct, or container. Foams are broadly used as insulators. References describing such uses and properties of foams include Oertel, G. "Polyurethane Handbook" Hanser Publishers, Munich, 1985, and Gibson, L. J.; Ashby, M. F. "Cellular Solids, Structure and Properties" Pergamon Press, Oxford, 1988. The term "insulator" refers to any material which reduces the transfer of energy from one location to another. Such energy may be include heat, acoustic, and/or mechanical types. Heat insulation is of particular importance and relates to the thermal conductivity of the insulating medium.

The "perfect" insulator is a vacuum. Developing and maintaining an evacuated space around the area to be insulated can, however, be impractical, particularly for larger volumes. The structural integrity required to withstand atmospheric pressure acting upon a vacuum vessel can be an issue.

A common insulating medium is a foam or cellular material having porous regions surrounded by a solid that provides integrity. The function of the foam as an insulator is to trap air and reduce thermal conductivity of the types described above. Foams are generally characterized by the size of the pores or cells within the structure as well as their density, which approximates the ratio of open-to-solid structure within the foam.

The thermal conductivity of any foam depends on four characteristics:

1. convection through the pores;
2. conduction through the gas;
3. conduction through the polymer; and
4. thermal radiation through the cell walls and across the cell voids.

Convection via movement of a gas through pores of an insulating medium diminishes with cell sizes down to about 4 mm, below which it becomes negligible. Convection through pores is suppressed in cells smaller than 10 mm. Most foams have cells much smaller than mm scale dimensions.

Conduction through the gas typically can account for as much as two-thirds of the system's thermal conduction. For this reason, foams filled with low conductivity gases can be preferred, although the gas will typically exchange with the atmosphere over time. Conduction through the solid polymer is negligible with low density foams.

Thermal radiation can account for one-quarter to one-third of the thermal conductivity in a foam. (See Glicksman, L. R.; Torpey, M.; Marge, A. *J. Cell. Plastics* 1992, 28, 571 and DeVos, R.; Rosbotham, D.; Deschaght, J. ibid 1994, 30, 302.) Radiative heat transfer is highly dependent on the cell size of the foam and decreases with cell size (which preferably would be $\leq 100$ µm). Kodama et al. (ibid., 1995, 31, 24) report on improvements in the k factor (a measure of thermal insulation ability) of a series of polyurethane foams ("PUFs") as average cell sizes decreased from 350 µm to 200 µm at a density of 0.052 g/cc. Doerge reports that foams with densities lower than about 0.037 g/cc showed increases in thermal conductivity attributable to the increase in cell sizes that typically occurs at these lower densities (Doerge, H. P. ibid., 1992, 28, 115), in part due to the increasing transparency of the cell walls and cell wall rupture (allowing rapid diffusion of the low conductivity gas filler). The best insulating rigid foams are low density foams (ca. 0.03–0.07 g/cc for closed cell PUFs) having the smallest cells possible filled with a gas having a low coefficient of thermal conductivity (or no gas at all). Thus, it would be desirable to produce foams having both low density and very small cells, e.g. $\leq 100$ µm. Such foams apparently cannot be produced by state-of-the-art blown foam processes.

The historical approach to making insulating foams for the appliance industry (e.g. refrigerators, water heaters, etc.) has been to use chlorofluorocarbons (CFCs) as physical inflating agents, especially for foams based on polyurethane and polyisocyanate starting materials. The reported association between CFCs and ozone layer depletion has sharply curtailed their production and increased the need for alternate materials and/or methods for making foams. Alternate blowing agents such as carbon dioxide or pentane however develop less efficient insulating foams relative to those made with CFCs. This results from the difficulty in achieving the same fineness of microstructure and densities possible with CFC blown foams. See for examples Moore, S. E. *J. Cell. Plastics* 1994, 30, 494 and U.S. Pat. No. 5,034,424 (Wenning et al.) Jul. 23, 1991. See also Oertel, p 273; Gibson and Ashby, Chapter 7, p 201.

Polyurethane foams are perhaps the most broadly used type in such applications. The chemistry used in processing presents certain disadvantages including poor photostability (see Valentine, C.; Craig, T. A.; Hager, S. L. *J. Cell. Plastics* 1993, 29, 569), the inevitable existence of undesirable chemical residues in the foams (see U.S. Pat. No. 4,211,847 to Kehr et at., issued Jul. 8, 1980, and U.S. Pat. No. 4,439,553 to Guthrie et al., issued Mar. 27, 1984, describing efforts to minimize these residues), and the production of noxious gases developed during burning due to the presence of nitrogen atoms within the composition (see Hartzell, G. E. *J. Cell. Plastics*. 1992, 28, 330). This can be particularly problematic in accidents involving public conveyances such as boats, automobiles, trains or airplanes which may catch fire. Injuries and fatalities may result solely from inhalation of these noxious gases. See Gibson and Ashby Chapter 8, p 212. This can also be an issue when the foam is discarded into a waste stream that is to be incinerated.

The building insulation industry has widely used foamed polystyrene rigid panels (in addition to glass batting and blown cellulose insulation). Styrene foam panels are useful in that they are rigid and may be nailed during construction, are hydrophobic to provide moisture resistance (which otherwise diminishes insulation value), and are relatively inexpensive. See Oertel p 277. This material is also widely used in beverage cups and food containers. The cell sizes of these materials are typically in the 300–500 µm range. Smaller celled polystyrene foams have been prepared using the Thermally Induced Phase Separation Process (TIPS) described in *Chemtech* 1991, 290 and U.S. Pat. No. 5,128,382 (Elliott, et al.) issued Jul. 7, 1992 incorporated herein by reference. An important issue in making polymeric insulating foams commercially attractive for use as insulators is economics. The economics of foams depend on the amount and cost of the monomers used, as well as the cost of converting the monomers to a usable polymeric foam. The effort to reduce the cost of such insulating foams, especially in terms of reducing the total amount of monomer used, can make it very difficult to achieve the desired insulation and mechanical properties.

Accordingly, it would be desirable to be able to make an open-celled insulating polymeric foam material that: (1) has adequate rigidity or flexibility according to the requirements of use; (2) can be made with relatively small cell sizes to limit thermal conductivity contributed by radiation; (3) can be made without chlorofluorocarbons or other gases which may induce undesired environmental problems; (4) contains no nitrogen chemically bound in the structure that, upon combustion, may release toxic gases; and (5) can be manufactured economically without sacrificing desired insulating and mechanical properties to an unacceptable degree.

SUMMARY OF THE INVENTION

The present invention relates to the use of polymeric foam materials for insulation. These polymeric foams are prepared by polymerization of certain water-in-oil emulsions having a relatively high ratio of water phase to oil phase, commonly known in the art as "HIPEs." As used herein, polymeric foam materials which result from the polymerization of such emulsions are referred to hereafter as "HIPE foams." The HIPE foam materials used in the present invention comprise a generally hydrophobic, flexible, semi-flexible, or rigid nonionic polymeric foam structure of interconnected open-cells. These foam structures have:

A) a specific surface area per foam volume of at least about 0.01 m²/cc;

B) a density of less than about 0.05 g/cc; and

C) a glass transition temperature (Tg) of between about −20° and 90° C.

The present invention provides the use of low density insulating foams prepared via polymerization of a HIPE comprising a discontinuous water phase and a continuous oil phase wherein the ratio of water to oil is at least about 12:1. The water phase generally contains an electrolyte and a water soluble initiator. The oil phase generally consists of substantially water-insoluble monomers polymerizable by free radicals, an emulsifier, and other optional ingredients defined below. The monomers are selected so as to confer the properties desired in the resulting polymeric foam, e.g. the glass transition (Tg) between about −20° and 90° C., mechanical integrity sufficient for the end use, and economy.

In a preferred embodiment of the present invention, the foams used can be prepared, packaged, and shipped in a compressed, high density state and will "spring back" upon activation (e.g. heat) to the original density and dimensions of the foam. These foams are referred to herein as "compressible foams". Such foams are described and claimed in copending application U.S. Ser. No. 08/484,727, filed Jun. 7, 1995, by T. DesMarais and J. Dyer. These compressible foams are particularly useful in building insulation wherein rolled batts of insulation are shipped to widely dispersed locations and the full volume of the transporting vehicle may be filled well before the weight limit of the vehicle is approached.

DETAILED DESCRIPTION OF THE INVENTION

I. Uses of Polymeric Foams

A. In General

Figure 1:
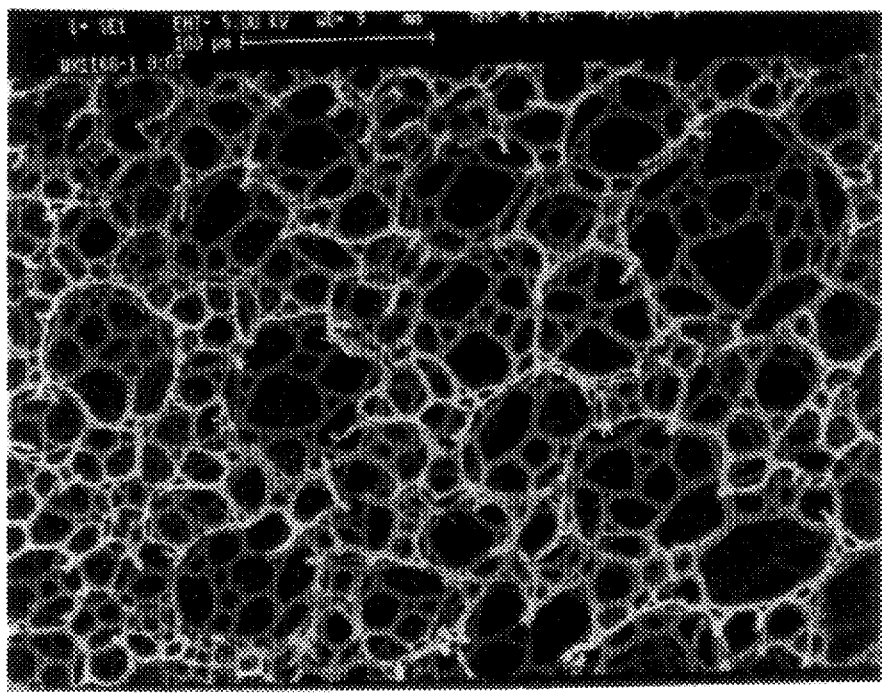
FIG. 1 of the drawings is a photomicrograph (250× magnification) of a cut section of a representative polymeric foam useful in the present invention made from HIPE having a 48:1 water-to-oil weight ratio and poured at 57° C., and where the monomer component consisted of a 12:14:62:12 weight ratio of styrene:technical grade divinyl benzene (about 55% DVB and about 45% ethyl styrene):2-ethylhexyl acrylate:1,4-butanediol dimethacrylate, and where 5% (by weight of the oil phase) of diglycerol monooleate (DGMO) and 1% commercial Span 85 emulsifiers were used.

Polymeric foams for the uses of the present invention are broadly useful as thermal insulating materials. In thermal insulation applications, these polymeric foams can be provided as relatively rigid slabs of foam for use where some rigidity is desired, as with vacuum insulation panels or with building construction insulation panels that are nailed to a support structure. For these uses, the foams would generally be provided in a fully expanded state and would comprise those formulations which yield a relatively high Tg, from about 50° to about 80° C. The formulation would also contain relatively higher levels of toughening monomers as described below. As rigid slabs, the foams of this invention may be laminated or bonded to other support media to provide stiffness, strength, or better insulating properties. For example, a thin sheet of reflective foil can be laminated on one or both sides of the foam slab so as to reduce further radiative heat transfer through the structure.

These polymeric foams may also be provided in virtually any shape desired. Preferably, such shapes will allow compressive dewatering of the polymerized emulsion so as to limit the expense and effort associated with water removal.

B. Insulating Articles

Polymeric foams derived from HIPEs are particularly useful in a variety of thermal applications including appliances (refrigerators, ovens, ranges, toasters, freezers), transportation equipment (cars, trains, planes, boats), buildings (wall insulation, attic insulation), and for many other uses. One preferred embodiment comprises the use of a continuous slice of said foam compressed to at least about one-third of its thinnest dimension, stored, shipped, and applied as a roll stock item, and expanded after application by either time and/or heat to restore the original dimensions and insulating properties.

Foams for the uses of the present invention may also be used inside vacuum insulation panels to provide strength and stiffness to the panel without adding much mass which would provide a pathway for convection of heat through the polymer structure. For such uses, it would generally be desirable to use high Tg versions of foams of the present invention, for example, between about 50° and 80° C. Such foams may still be effectively dewatered by squeezing if the water is heated to near the Tg during the squeeze-out process. The ability to remove the water from the foams of the present invention by squeezing is highly preferred so as to limit cost and process complexity. Since the foams of the present invention can be manufactured with very low densities (e.g. <0.020 g/cc), they are particularly useful as vacuum insulation structural filler. The small cell sizes feasible with these foams reduce radiative heat transfer through the vacuum panel. The low density provides relatively little solid polymer through which thermal energy may be conducted. These two attributes are of particular significance herein where conduction through the gas of a foam is negligible.

C. Other Uses

These foams can also be employed as insulators against acoustic or mechanical forces. When intended for use as insulators against transmission of acoustic and/or mechanical vibrations, these foams are particularly useful in that both the Tg of the material and the width of the transition can be optimized for the specific application. It is generally desirable that the Tg of the foam be closely aligned with the temperature and frequency of the midpoint of the acoustic or vibration energy to be damped. The foams of the present invention are easily "tuned" to this end, as described below. For example, if a continuous noise of 1000 Hz at 25° C. is to be damped, the Tg of the foam measured at 1000 Hz should be 25° C. If the noise or vibration is of a combination of frequencies (as is usually the case), or if the damping is desired over a wider temperature range, then the glass-to-rubber transition region of the foam should be as broad as possible. Alternately, the foam can be post-treated with a second polymeric material to make a macroscopic interpenetrating network wherein both polymers will contribute to sound/vibration damping at different regions of temperature and frequency. Further descriptions of genetic uses of foams as acoustic or mechanical shock insulators are given in Brandup, J.; Immergut, E. H. "Polymer Handbook", 2nd Ed., Wiley-Interscience, New York, N.Y., 1975, pp 240–242 and pp 210–216 and pp 286–325.

II. Insulating Polymeric Foam

A. General Foam Characteristics

The polymeric foams used in accordance with the present invention are relatively open-celled. This means the individual cells of the foam are in complete, unobstructed communication with adjoining cells. The cells in such substantially open-celled foam structures have intercellular openings or "windows" connecting one cell to the other within the foam structure.

These substantially open-celled foam structures will generally have a reticulated character with the individual cells being defined by a plurality of mutually connected, three dimensionally branched webs. The strands of polymeric material making up these branched webs can be referred to as "struts." Open-celled foams having a typical strut-type structure are shown by way of example in the photomicrographs of FIGS. 1 and 2. As used herein, a foam material is "open-celled" if at least 80% of the cells in the foam structure that are at least 1 µm in size are in open communication with at least one adjacent cell.

In addition to being open-celled, these polymeric foams are generally hydrophobic to inhibit the passage of aqueous fluids through the foam. The internal surfaces of the foam structures are rendered hydrophobic by removal of hydrophilizing surfactants and salts left in the foam structure after polymerization, or by selected post-polymerization foam treatment procedures, as described hereafter.

The foams used according to the present invention are readily optimized so as to confer the properties desired in each specific application. The ease of control over a wide range of properties of these foams is unprecedented. As examples, these foams may be hydrophilic or hydrophobic (preferably hydrophobic); microcellular (<10 µm) up through moderate cell diameters (ca. 100 µm); low density (0.05 g/cc) to very low density (0.005 g/cc); rigid to flexible (corresponding, high Tg to low (subambient) Tg); and strong to weak. The foams may be provided as continuous sheets, rigid thick boards, particulates of various sizes, specific shapes, etc., as required by their end use. However optimized, these foams avoid some of the deficiencies associated with the foam methods described hereinabove. That is, they preferably contain no nitrogen so that burning produces no unusually noxious gases, require no CFC or volatile organic compound ("VOC") materials during manufacture, are producible readily in large quantities with reasonable economics as either slabstock, roll stock, particulate foam, and the like. Further, the foams used in the present invention are inherently photostable.

In a preferred embodiment, the polymeric foams can be prepared in the form of compressed, polymeric foams that, upon heating or the passage of time, expand and reach their full insulating capability (herein referred to as "compressible foams"). These collapsed polymeric foams are usually obtained by expressing the water phase from the polymerized HIPE foam through compressive forces, and/or thermal drying and/or vacuum dewatering. After compression, and/ or thermal drying/vacuum dewatering followed by rapid chilling, the polymeric foam is in a compressed, or unexpanded state.

A key parameter of these compressible foams is their glass transition temperature (Tg). The Tg represents the midpoint of the transition between the glassy and rubbery states of the polymer. Foams that have a Tg higher than the temperature of use can be very strong but will also be very rigid and potentially prone to fracture. Such foams also typically take a long time to recover to the expanded state after having been stored in the compressed state for prolonged periods. Though the end use of a particular foam is an important factor when determining the desired Tg of the foam, preferred are foams having a Tg of from about 0° to about 50° C. More preferred are foams having a Tg of from about 10° to about 40° C.

B. Foam Density

Another important properly of the insulating foams used in the present invention is their density. "Foam density" (i.e., in grams of foam per cubic centimeter of foam volume in air) is specified herein on a dry basis, unless otherwise indicated. Any suitable gravimetric procedure that will provide a determination of mass of solid foam material per unit volume of foam structure can be used to measure foam density. For example, an ASTM gravimetric procedure described more fully in the TEST METHODS section of U.S. Pat. No. 5,387,207 (Dyer et al), issued Feb. 7, 1995 (incorporated by reference herein) is one method that can be employed for density determination. While foams can be made with virtually any density ranging from below that of air to just less than the bulk density of the polymer from which it is made, the foams of the present invention are most useful when they have a dry density in the expanded state of less than about 0.05 g/cc, preferably between about 0.08 and about 0.004 g/cc, more preferably between about 0.038 and 0.013 g/cc, and most preferably about 0.03 g/cc.

C. Other Properties of Polymeric Foam

Foam cells, and especially cells that are formed by polymerizing a monomer-containing oil phase that surrounds relatively monomer-free water-phase droplets, will frequently be substantially spherical in shape. The size or "diameter" of such spherical cells is a commonly used parameter for characterizing foams in general. Since cells in a given sample of polymeric foam will not necessarily be of approximately the same size, an average cell size, i.e., average cell diameter, will often be specified.

Figure 2:
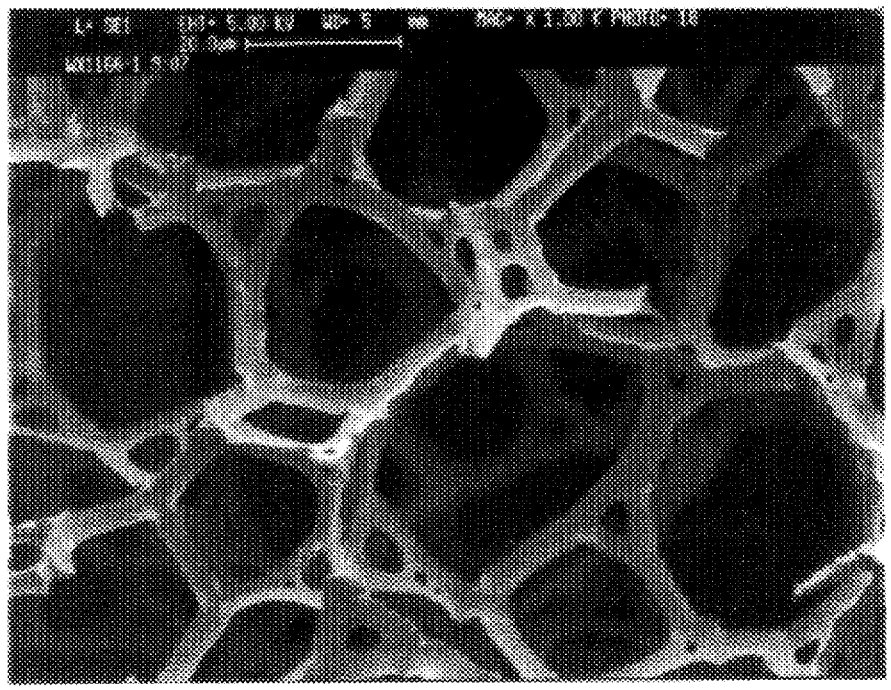
FIG. 2 of the drawings is a photomicrograph (1000× magnification) of the foam of FIG. 1.
Figure 3:
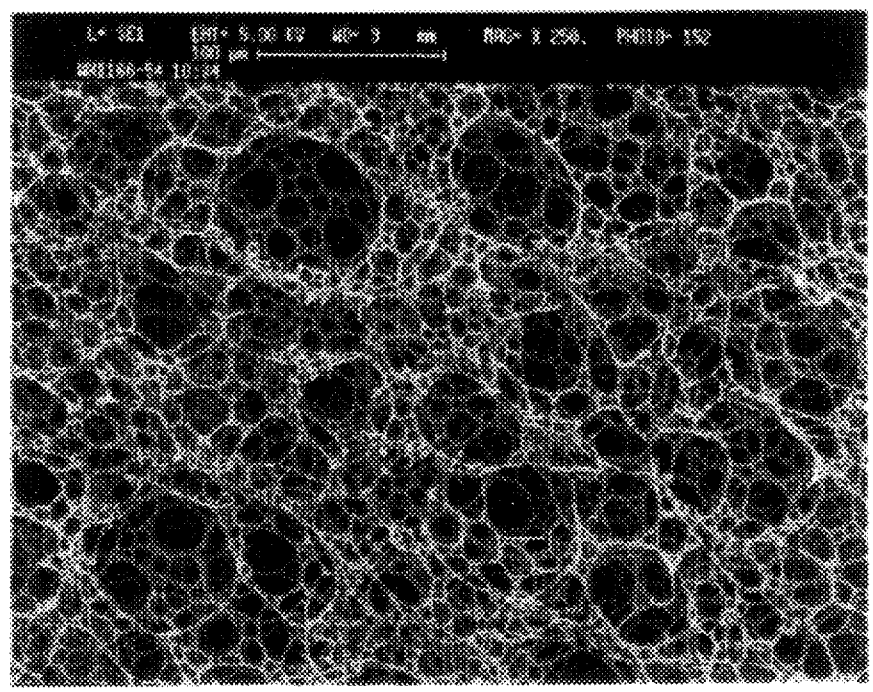
FIG. 3 of the drawings is a photomicrograph (250× magnification) of a cut section of a representative polymeric foam useful in the present invention made from HIPE having a 140:1 water-to-oil weight ratio and poured at 37° C., and where the monomer component consisted of a 20:20:60 weight ratio of styrene:technical grade divinyl benzene (about 55% DVB and about 45% ethyl styrene):2-ethylhexyl acrylate, and where 6% (by weight of the oil phase) of diglycerol monooleate (DGMO).
Figure 4:
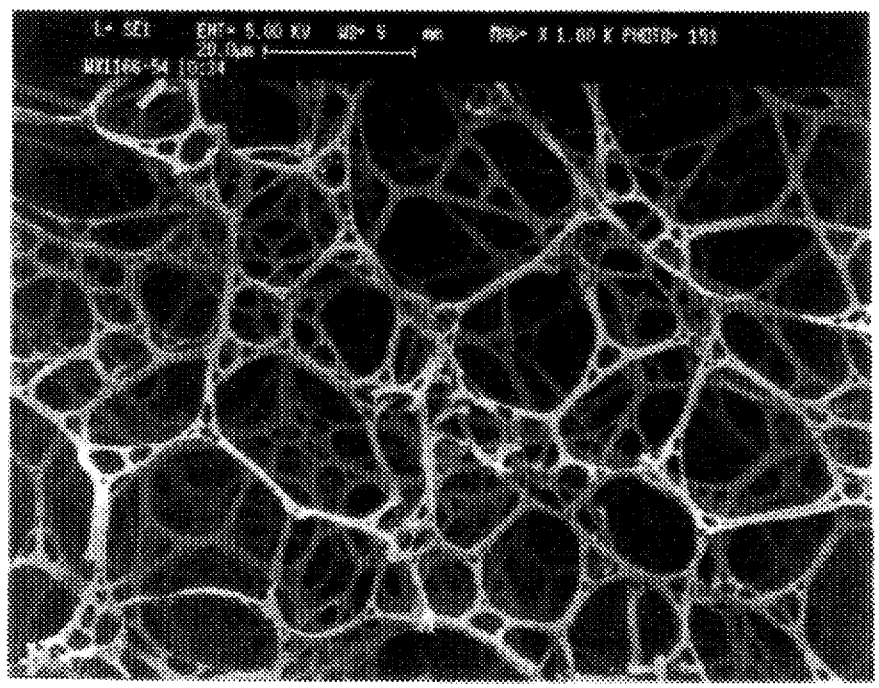
FIG. 4 of the drawings is a photomicrograph (1000× magnification) of the foam of FIG. 3.

A number of techniques are available for determining the average cell size of foams. The most useful technique, however, for determining cell size in foams involves a simple measurement based on the scanning electron photomicrograph of a foam sample. FIG. 1, for example, shows a typical HIPE foam structure according to the present invention in its expanded state. Superimposed on the photomicrograph is a scale representing a dimension of 20 µm. Such a scale can be used to determine average cell size via an image analysis procedure.

The cell size measurements given herein are based on the number average cell size of the foam in its expanded state, e.g., as shown in FIG. 1. The foams useful as insulation materials in accordance with the present invention will preferably have a number average cell size of less than about 100 µm, more preferably from about 10 to 50 µm, and most preferably from about 15 µm to 35 µm.

D. Specific Surface Area

Another key parameter of the foams is their specific surface area, which is determined by both the dimensions of the cellular units in the foam and by the density of the polymer, and is thus a way of quantifying the total amount of solid surface provided by the foam.

Specific surface area is determined by measuring the amount of capillary uptake of a low surface tension liquid (e.g., ethanol) which occurs within a foam sample of known mass and dimensions. A detailed description of such a procedure for determining foam specific surface area via the capillary suction method is set forth in the TEST METHODS section of U.S. Pat. No. 5,387,207 (Dyer et at.), issued Feb. 7, 1995, which is incorporated herein by reference. Other similar tests for determining specific surface area can be used with the present insulation foams.

The foams of the present invention have a specific surface area of at least about 0.01 m²/cc, preferably at least about 0.025 m²/cc.

E. Compressible Foams

With regard to foams that can be maintained in a compressed state, this state is maintained by keeping the polymeric foam substantially below the Tg of the polymer. In this state, the flow of the individual polymer chains is relatively slow. However, the thermoset characteristic of these foams (deriving from a relatively high level of crosslinker incorporated therein) provides memory of the prexisting expanded state. Thus, when warmed or allowed to stand unrestrained, the foams will recover their original dimensions. These dimensions provide for the low density inherent in providing a useful insulating material. This attribute is particularly useful wherein the foam is to be shipped, stored, and applied in roll form to cover a comparatively large area such as an attic of a dwelling. During these steps it occupies considerably less bulk than is characteristic of fiberglass batting, for example. During or after application, either heat and/or the passage of time will restore its original dimensions and insulating ability. The Tg of the polymeric foam is obviously important to maintaining stability in the compressed state and still provide for reexpansion within a reasonable period or at achievable temperatures.

Upon exposure to heat or the passage of time, the compressed foams used in a preferred embodiment regain their original dimensions and shape. This is attributable to the thermoset nature of the polymer used to make the foam. Generally, the foams are compressed in one dimension, called the "z-direction", which is the thinnest dimension of a sliced sheet of foam. Upon recovery of the original expanded dimensions of the foam, an "expansion factor" can be defined which relates the ratio of the thinnest dimension in the expanded versus the compressed state. For these compressible foams, the expansion factor is at least about 3×, i.e. the thickness of the foam in its expanded state is at least about 3 times the thickness of the foam in its compressed state. The compressible foams typically have an expansion factor in the range of from about 3× to about 10×. By comparison, compressed fiberglass batting foams typically have a recoverable expansion factor of only about 2×.

As an example, a foam made by polymerizing a HIPE comprising 35% styrene, 20% divinyl benzene, and 45% 2-ethylhexyl acrylate with a density of 0.020 and Tg of 40° C. can be compressed when filled with water at 40° C. and chilled immediately after release from compression. The degree of compression is governed by the geometry of the nip rolls though which it is passed, the density of the foam, and, to a lesser extent, the rate and temperature at which it is compressed. In this instant, the foam can be compressed about 5× to about 20% of its original thickness. The compressed foam will retain that set almost indefinitely when stored at a temperature of about 8° C. or more below the Tg of the foam (in this case, less than about 32° C.). That is, the compressed foam will regain no more than about 10% of its original thickness over a period of at least about a week unrestrained at ambient temperature (22° C.). In other words, it will expand to no more than about 30% of its original thickness. In practice, the foams will grow much less over even longer periods of time, particularly if restrained by appropriate packaging in, for example, shrink-wrapped roll form. When the foam is heated to at least about its Tg (in this case, 40° C.), it will regain virtually all of its original thickness, or at least about 80% of its original thickness, in a period of about an hour, preferably less. In practice, such a foam would regain more than 90% of its original thickness when heated to at least about 40° C. in less than an hour. These conditions approximate what might be encountered, for example, in an attic in summer time after the compressed foam had been released from shrink-wrapping and applied as desired.

III. Preparation of Polymeric Foams From HIPE Having Relatively High Water-to-Oil Ratios A. In General Polymeric foams useful in the present invention are prepared by polymerization of HIPEs. The relative amounts of the water and oil phases used to form the HIPEs are, among many other parameters, important in determining the structural, mechanical and performance properties of the resulting polymeric foams. In particular, the ratio of water to oil in the emulsion can influence the density, cell size, and specific surface area of the foam and dimensions of the struts that form the foam. The emulsions used to prepare the HIPE foams will generally have a volume to weight ratio of water phase to oil phase in the range of from about 12:1 to about 250:1, more preferably from about 25:1 to about 125:1, most preferably about 30:1.

The process for obtaining these foams comprises the steps of:

(A) forming a water-in-oil emulsion at a temperature of about 30° C. or higher and under low shear mixing from:
    (1) an oil phase comprising:

(a) from about 80% to about 98% by weight of a monomer component capable of forming a copolymer having a Tg value of from about −20° C. to about 90° C., said monomer component comprising:
  (i) from about 10% to about 70% by weight of a substantially water-insoluble, monofunctional monomer capable of forming a homopolymer having a Tg of about 35° C. or less;
  (ii) from about 10% to about 70% by weight of a substantially water-insoluble, monofunctional comonomer capable of imparting toughness about equivalent to that provided by styrene;
  (iii) from about 2% to about 50% of a first substantially water-insoluble, polyfunctional crosslinking agent selected from the group consisting of divinyl benzene and analogs thereof; and
  (iv) from about 0% to about 15% of a second substantially water-insoluble, polyfunctional crosslinking agent selected from the group consisting of diacrylates of diols and analogs thereof; and
(b) from about 2% to about 20% by weight of an emulsifier component which is soluble in the oil phase and which is suitable for forming a stable water-in-oil emulsion;
(2) a water phase comprising from about 0.1% to about 20% by weight of a water-soluble electrolyte; and
(3) a volume to weight ratio of water phase to oil phase in the range of from about 12:1 to about 250:1; and
(B) polymerizing the monomer component in the oil phase of the water-in-oil emulsion to form the polymeric foam material.

The polymeric foam material can be subsequently iteratively washed and dewatered to provide a dry, hydrophobic foam that may be shaped as desired. Typically, this shaping will comprise slicing into relatively thin sheets. These sheets may optionally be compressed, e.g. continuously through pressure nips, into a thin state and wound into rolls. Preferred compressible sheets will retain their relatively thin compressed state until unwound, applied as desired, and either heated above their activation temperature (usually about the Tg of the polymer) or allowed to stand for a relatively long period of time, e.g. several weeks or months, depending on the ambient temperature.

1. Oil Phase Components

The continuous oil phase of the HIPE comprises monomers that are polymerized to form the solid foam structure. This monomer component is formulated to be capable of forming a copolymer having a Tg of from about −20° to about 90° C., and preferably from about 15° to about 50° C., more preferably from about 20° to about 40° C. (The method for determining Tg by Dynamic Mechanical Analysis (DMA) is described in the TEST METHODS section infra. This monomer component includes: (a) at least one monofunctional monomer whose atactic amorphous polymer has a Tg of about 25° C. or lower (see Brandup, J.; Immergut, E. H. "Polymer Handbook", 2nd Ed., Wiley-Interscience, New York, N.Y., 1975, III-139.); (b) at least one monofunctional comonomer to improve the toughness or tear resistance of the foam; (c) a first polyfunctional crosslinking agent; and (d) optionally a second polyfunctional crosslinking agent. Selection of particular types and amounts of monofunctional monomer(s) and comonomer(s) and polyfunctional cross-linking agent(s) can be important to the realization of absorbent HIPE foams having the desired combination of structure, and mechanical properties which render such materials suitable for use in the invention herein.

The monomer component comprises one or more monomers that tend to impart rubber-like properties to the resulting polymeric foam structure. Such monomers can produce high molecular weight (greater than 10,000) atactic amorphous polymers having Tgs of about 25° C. or lower. Monomers of this type include, for example, the $C_4$–$C_{14}$ alkyl acrylates such as butyl acrylate, hexyl acrylate, octyl acrylate, 2-ethylhexyl acrylate, nonyl acrylate, decyl acrylate, dodecyl (lauryl) acrylate, isodecyl acrylate, tetradecyl acrylate; aryl and alkaryl acrylates such as benzyl acrylate and nonylphenyl acrylate; the $C_6$–$C_{16}$ alkyl methacrylates such as hexyl methacrylate, octyl methacrylate, nonyl methacrylate, decyl methacrylate, isodecyl methacrylate, dodecyl (lauryl) methacrylate, and tetradecyl methacrylate; acrylamides such as N-octadecyl acrylamide; $C_4$–$C_{12}$ alkyl styrenes such as p-n-octylstyrene; and combinations of such monomers. Of these monomers, isodecyl acrylate, dodecyl acrylate and 2-ethylhexyl acrylate are the most preferred. The monofunctional monomer(s) will generally comprise 10 to about 70%, more preferably from about 20 to about 50%, by weight of the monomer component.

The monomer component utilized in the oil phase of the HIPEs also comprises one or more monofunctional comonomers capable of imparting toughness about equivalent to that provided by styrene to the resulting polymeric foam structure. Tougher foams exhibit the ability to deform substantially without failure. These monofunctional comonomer types can include styrene-based comonomers (e.g., styrene and ethyl styrene) or other monomer types such as methyl methacrylate where the related homopolymer is well known as exemplifying toughness. The preferred monofunctional comonomer of this type is a styrene-based monomer with styrene and ethyl styrene being the most preferred monomers of this kind. The monofunctional "toughening" comonomer will normally comprise from about 10 to about 70%, preferably from about 20% to about 50%, most preferably from about 30% to about 50%, by weight of the monomer component.

In certain cases, the "toughening" comonomer can also impart the desired rubber-like properties to the resultant polymer. The $C_4$–$C_{12}$ alkyl styrenes, and in particular p-n-octylstyrene, are examples of such comonomers. For such comonomers, the amount that can be included in the monomer component will be that of the typical monomer and comonomer combined.

The monomer component also contains a first (and optionally a second) polyfunctional crosslinking agent. As with the monofunctional monomers and comonomers, selection of the particular type and amount of crosslinking agent(s) is important to the eventual realization of preferred polymeric foams having the desired combination of structural and mechanical properties.

The first polyfunctional crosslinking agent can be selected from a wide variety of monomers containing two or more activated vinyl groups, such as divinylbenzenes and analogs thereof. Analogs of divinylbenzenes useful herein include, but are not limited to, trivinyl benzenes, divinyltoluenes, divinylxylenes, divinylnaphthalenes divinylalkylbenzenes, divinylphenanthrenes, divinylbiphenyls, divinyldiphenylmethanes, divinylbenzyls, divinylphenylethers, divinyldiphenylsulfides, divinylfurans, divinylsulfide, divinylsulfone, and mixtures thereof. Divinylbenzene is typically available as a mixture with ethyl styrene in proportions of about 55:45. These proportions can be modified so as to enrich the oil phase with one or the other component. Generally, it is advantageous to enrich the mixture with the ethyl styrene component while simultaneously reducing the amount of styrene in the monomer blend. The preferred ratio of divinylbenzene to ethyl styrene is from about 30:70 to 55:45, most preferably from about 35:65 to about 45:55. The inclusion of higher levels of ethyl styrene imparts the required toughness without increasing the Tg of the resulting copolymer to the degree that styrene does. This first cross-linking agent can generally be included in the oil phase of the HIPE in an amount of from about 2 to about 50%, more preferably from about 10 to about 35%, most preferably from about 15% to about 25%, by weight of the monomer component (100% basis).

The optional second crosslinking agent can be selected from polyfunctional acrylates selected from the group consisting of diacrylates of diols and analogs thereof. Such crosslinking agents include methacrylates, acrylamides, methacrylamides, and mixtures thereof. These include di-, tri-, and tetra-acrylates, as well as di-, tri-, and tetra-methacrylates, di-, tri-, and tetra-acrylamides, as well as di-, tri-, and tetra-methacrylamides; and mixtures of these crosslinking agents. Suitable acrylate and methacrylate crosslinking agents can be derived from diols, triols and tetraols that include 1,10-decanediol, 1,8-octanediol, 1,6-hexanediol, 1,4-butanediol, 1,3-butanediol, 1,4-but-2-enediol, ethylene glycol, diethylene glycol, trimethylolpropane, pentaerythritol, hydroquinone, catechol, resorcinol, triethylene glycol, polyethylene glycol, sorbitol and the like. (The acrylamide and methacrylamide crosslinking agents can be derived from the equivalent diamines, triamines and tetramines). The preferred diols have at least 2, more preferably at least 4, most preferably 6, carbon atoms. This second cross-linking agent can generally be included in the oil phase of the HIPE in an amount of from 0 to about 15% by weight of the monomer component.

The major portion of the oil phase of the HIPEs will comprise the aforementioned monomers, comonomers and crosslinking agents. It is essential that these monomers, comonomers and crosslinking agents be substantially water-insoluble so that they are primarily soluble in the oil phase and not the water phase. Use of such substantially water-insoluble monomers ensures that HIPEs of appropriate characteristics and stability will be realized. It is, of course, highly preferred that the monomers, comonomers and crosslinking agents used herein be of the type such that the resulting polymeric foam is suitably non-toxic and appropriately chemically stable. These monomers, comonomers and cross-linking agents should preferably have little or no toxicity if present at very low residual concentrations during post-polymerization foam processing and/or use.

Another essential component of the oil phase of the HIPE is an emulsifier component that comprises at least a primary emulsifier. Suitable primary emulsifiers are well known to those skilled in the art. Particularly preferred emulsifiers include Span 20™, Span 40™, Span 60™, and Span 80™. These are nominally esters of sorbitan derived from lauric, myristic, stearic, and oleic acids, respectively. Other preferred emulsifiers include the diglycerol esters derived from monooleate, monomyristate, monopalmitate, and monoisostearate acids. A preferred coemulsifier is ditallowdimethyl ammonium methyl sulfate. Mixtures of these emulsifiers are also particularly useful, as are purified versions of each, specifically sorbitan esters containing minimal levels of isosorbide and polyol impurities.

In addition to these primary emulsifiers, secondary emulsifiers can be optionally included in the emulsifier component. Again, those skilled in the art well recognize that any of a variety of known emulsifiers may be used. These secondary emulsifiers are at least cosoluble with the primary emulsifier in the oil phase. Secondary emulsifiers can be obtained commercially or prepared using methods known in the art. The preferred secondary emulsifiers are ditallow dimethyl ammonium methyl sulfate and ditallow dimethyl ammonium methyl chloride. When these optional secondary emulsifiers are included in the emulsifier component, it is typically at a weight ratio of primary to secondary emulsifier of from about 50:1 to about 1:4, preferably from about 30:1 to about 2:1.

As is indicated, those skilled in the art will recognize that any suitable emulsifier(s) can be used in the processes for making the foams of the present invention. For example, See U.S. Patent 5,387,207 and copending U.S. application Ser. No. 08/370,695, filed Jan. 10, 1995 by Stone et al.

The oil phase used to form the HIPEs comprises from about 85 to about 98% by weight monomer component and from about 2 to about 15% by weight emulsifier component. Preferably, the oil phase will comprise from about 90 to about 97% by weight monomer component and from about 3 to about 10% by weight emulsifier component. The oil phase also can contain other optional components. One such optional component is an oil soluble polymerization initiator of the general type well known to those skilled in the art, such as described in U.S. Pat. No. 5,290,820 (Bass et al), issued Mar. 1, 1994, which is incorporated by reference.

A preferred optional component is an antioxidant such as a Hindered Amine Light Stabilizer (HALS) such as bis-(1, 2,2,5,5-pentamethylpiperidinyl) sebacate (Tinuvin-765®) or a Hindered Phenolic Stabilizer (HPS) such as Irganox-1076® and t-butylhydroxy-quinone. Another preferred optional component is a plasticizer such as dioctyl azelate, dioctyl sebacate or dioctyl adipate. Yet another optional ingredient is filler particles which may toughen the polymer and/or increase its thermal insulating properties. Example filler particules include aluminum, titanium dioxide, carbon black, graphite, calcium carbonate, talc, and the like. Generally, particles which help make the polymer opaque in the infrared region are preferred, such as carbon black and graphite. Other optional components include colorants (dyes or pigments), fluorescent agents, opacifying agents, chain transfer agents, and the like.

2. Water Phase Components

The discontinuous water internal phase of the HIPE is generally an aqueous solution containing one or more dissolved components. One essential dissolved component of the water phase is a water-soluble electrolyte. The dissolved electrolyte minimizes the tendency of monomers, comonomers, and crosslinkers that are primarily oil soluble to also dissolve in the water phase. This, in turn, is believed to minimize the extent to which polymeric material fills the cell windows at the oil/water interfaces formed by the water phase droplets during polymerization. Thus, the presence of electrolyte and the resulting ionic strength of the water phase is believed to determine whether and to what degree the resulting preferred polymeric foams can be open-celled.

Any electrolyte capable of imparting ionic strength to the water phase can be used. Preferred electrolytes are mono-, di-, or trivalent inorganic salts such as the water-soluble halides, e.g., chlorides, nitrates and sulfates of alkali metals and alkaline earth metals. Examples include sodium chloride, calcium chloride, sodium sulfate and magnesium sulfate. Calcium chloride is the most preferred for use in preparing the HIPEs. Generally the electrolyte will be utilized in the water phase of the HIPEs in a concentration in the range of from about 0.2 to about 20% by weight of the water phase. More preferably, the electrolyte will comprise from about 1 to about 10% by weight of the water phase.

The HIPEs will also typically contain an effective amount of a polymerization initiator. Such an initiator component is generally added to the water phase of the HIPEs and can be any conventional water-soluble free radical initiator. These include peroxygen compounds such as sodium, potassium and ammonium persulfates, hydrogen peroxide, sodium peracetate, sodium percarbonate and the like. Conventional redox initiator systems can also be used. Such systems are formed by combining the foregoing peroxygen compounds with reducing agents such as sodium bisulfite, L-ascorbic acid or ferrous salts.

The initiator can be present at up to about 20 mole percent based on the total moles of polymerizable monomers present in the oil phase. More preferably, the initiator is present in an amount of from about 0.001 to about 10 mole percent based on the total moles of polymerizable monomers in the oil phase.

3. Hydrophilizing Surfactants and Hydratable Salts

The polymer forming the HIPE foam structure will preferably be substantially free of polar functional groups. This means the polymeric foam will be relatively hydrophobic in character. When these foams are to be used as insulating materials, resistance to water is generally a desired feature. Removal of the residual emulsifier and/or salt following polymerization is generally desired in a manner described more fully hereafter.

B. Processing Conditions for Obtaining HIPE Foams

Foam preparation typically involves the steps of: 1) forming a stable high internal phase emulsion (HIPE); 2) polymerzing/curing this stable emulsion under conditions suitable for forming a solid polymeric foam structure; 3) optionally washing the solid polymeric foam structure to remove the original residual water phase, emulsifier, and salts from the polymeric foam structure, and 4) thereafter dewatering this polymeric foam structure.

1. Formation of HIPE

The HIPE is formed by combining the oil and water phase components in the previously specified ratios. The oil phase will typically contain the requisite monomers, comonomers, crosslinkers, and emulsifiers, as well as optional components such as plasticizers, antioxidants, flame retardants, and chain transfer agents. The water phase will typically contain electrolytes and polymerization initiators.

The HIPE can be formed from the combined oil and water phases by subjecting these combined phases to shear agitation. Shear agitation is generally applied to the extent and for a time period necessary to form a stable emulsion. Such a process can be conducted in either batchwise or continuous fashion and is generally carried out under conditions suitable for forming an emulsion where the water phase droplets are dispersed to such an extent that the resulting polymeric foam will have the requisite structural characteristics. Emulsification of the oil and water phase combination will frequently involve the use of a mixing or agitation device such as a pin impeller.

One preferred method of forming HIPE involves a continuous process that combines and emulsifies the requisite oil and water phases. In such a process, a liquid stream comprising the oil phase is formed. Concurrently, a separate liquid stream comprising the water phase is also formed. The two separate streams are then combined in a suitable mixing chamber or zone such that the requisite water to oil phase weight ratios previously specified are achieved.

In the mixing chamber or zone, the combined streams are generally subjected to shear agitation provided, for example, by a pin impeller of suitable configuration and dimensions. Shear will typically be applied to the combined oil/water phase stream at an appropriate rate. Once formed, the stable liquid HIPE can then be withdrawn from the mixing chamber or zone. This preferred method for forming HIPEs via a continuous process is described in greater detail in U.S. Pat. No. 5,149,720 (DesMarais et al), issued Sep. 22, 1992, which is incorporated by reference. See also copending U.S. application Ser. No. 08/370,694, filed Jan. 10, 1995 by T. DesMarais (incorporated herein by reference), which describes an improved continuous process having a recirculation loop for the HIPE.

2. Polymerization/Curing of the HIPE

The HIPE formed will generally be collected or poured in a suitable reaction vessel, container or region to be polymerized or cured. In one embodiment, the reaction vessel comprises a tub constructed of polyethylene from which the eventually polymerized/cured solid foam material can be easily removed for further processing after polymerization/curing has been carried out to the extent desired. The temperature at which the HIPE is poured into the vessel is preferably approximately the same as the polymerization/curing temperature.

Suitable polymerization/curing conditions will vary depending upon the monomer and other makeup of the oil and water phases of the emulsion (especially the emulsifier systems used), and the type and amounts of polymerization initiators used. Frequently, however, suitable polymerization/curing conditions will involve maintaining the HIPE at elevated temperatures above about 30° C., more preferably above about 35° C., for a time period ranging from about 2 to about 64 hours, more preferably from about 4 to about 48 hours. The HIPE can also be cured in stages such as described in U.S. Pat. No. 5,189,070 (Brownscombe et al), issued Feb. 23, 1993, which is herein incorporated by reference.

One particular advantage of the more robust emulsifier systems used in these HIPEs is that the polymerization/curing conditions can be carried out at more elevated temperatures of about 50° C. or higher, more preferably about 60° C. or higher. Typically, the HIPE can be polymerized/cured at a temperature of from about 60° to about 99° C., more typically from about 65° to about 95° C.

A porous water-filled open-celled HIPE foam is typically obtained after s polymerization/curing in a reaction vessel, such as a tub. This polymerized HIPE foam is typically cut or sliced into a sheet-like form. Sheets of polymerized HIPE foam are easier to process during subsequent treating/washing and dewatering steps, as well as to prepare the HIPE foam for use in insulation materials. The polymerized HIPE foam is typically cut/sliced to provide a cut thickness in the range of from about 0.08 in. to about 3.5 in. Subsequent dewatering by compressing the foam in the z-direction typically leads to HIPE foams having a thickness in the range of from about 10 to about 17% of its cut thickness.

3. Treating/Washing HIPE Foam

The polymerized HIPE foam formed will generally be filled with residual water phase material used to prepare the HIPE. This residual water phase material (generally an aqueous solution of electrolyte, residual emulsifier, and polymerization initiator) should be removed prior to further processing and use of the foam. Removal of this original water phase material will usually be carried out by compressing the foam structure to squeeze out residual liquid and/or by washing the foam structure with water or other aqueous washing solutions. Frequently several compressing and washing steps, e.g., from 2 to 4 cycles, can be used. It is preferable that the water used in these washing be heated to at least about the Tg of the polymer so as to maintain its flexibility and compliance during compressive dewatering and reduce and prevent damage to the foam structure.

4. Foam Dewatering

After the HIPE foam has been treated/washed, it will be dewatered. Dewatering can be achieved by compressing the foam to squeeze out residual water, by subjecting the foam, or the water therein to temperatures of from about 60° to about 200° C. or to microwave treatment, by vacuum dewatering or by a combination of compression and thermal drying/microwave/vacuum dewatering techniques. These HIPE foams are typically compressively dewatered to a thickness of about ⅓ (33%) or less of their fully expanded thickness. The dewatering step will generally be carried out until the HIPE foam is ready for use and is as dry as practicable. Frequently such compression dewatered foams will have a water (moisture) content as low as possible, from about 1% to about 15%, more preferably from about 5% to about 10%, by weight on a dry weight basis.

IV. Test Methods

A. Dynamic Mechanical Analysis (DMA)

DMA is used to determine the Tgs of polymers including polymeric foams. Samples of the foams are sliced into blocks 3–5 mm in thickness and washed 3–4 times in distilled water, expressing the fluid through roller nips between each washing. The resulting foam blocks are allowed to dry in air. The dried foam slices are cored to yield a cylinders 25 mm in diameter. These cylinders are analyzed using a Rheometrics RSA-II dynamic mechanical analyzer set in compression mode using parallel plates 25 mm in diameter. Instrument parameters used are as follows:

Temperature step from ca. 85° C. to −40° C. in steps of 2.5° C.

Soak intervals between temperature changes of 125–160 seconds

Dynamic strain set at 0.1% to 1.0% (usually 0.7%)

Frequency set at 1.0 radians/second

Autotension set in static force tracking dynamic force mode with initial static force set at 5 g.

The glass transition temperature is taken as the maximum point of the loss tangent versus temperature curve.

B. Expansion Factor

Expansion factor can be quantified by measuring the thickness of a foam sample in the collapsed (compressed) state and in the expanded state. The ratio of the expanded thickness to the initial collapsed thickness is the expansion factor.

The foam sample in its compressed state is placed on a flat granite base under a gauge suitable for measuring the sample thickness. The gauge is set up to exert a pressure of 0.08 psi on the sample. Any gauge fitted with a foot having a circular surface area of at least 1 in$^2$ (6.5 cm$^2$) and capable of measuring thickness to 0.0010 in (0.025 mm) can be employed. Examples of such gauges are an Ames model 482 (Ames Co.; Waltham, Mass.) or an Ono-Sokki model EG-225 (Ono-Sokki Co., Ltd.; Japan). The initial thickness is recorded ($X_0$).

The assembly including the foam is then placed in an oven set at $T=Tg+20°$ C. After 60 minutes, the expanded thickness ($X_1$) is recorded. The expansion factor (EF) is calculated as $EF=X_1/X_0$. The expansion factor may be recorded after storage at $T=Tg+20°$ C. for 1 day or longer to ensure that complete recovery to the dimensions of the unexpanded sample are obtained. Generally, the sample is left at the higher temperature until no further reexpansion is recorded.

C. Specific Surface Area

As discussed supra, a detailed description of a procedure for determining foam specific surface area via the capillary suction method is set forth in the TEST METHODS section of U.S. Pat. No. 5,387,207.

V. Specific Examples

The following examples illustrate the preparation of HIPE foams useful in the present invention.

EXAMPLE 1

Preparation of Foam from a HIPE

A) HIPE Preparation

Anhydrous calcium chloride (36.32 kg) and potassium persulfate (189 g) are dissolved in 378 liters of water. This provides the water phase stream to be used in a continuous process for forming the HIPE.

To a monomer combination comprising styrene (2400 g), divinylbenzene 55% technical grade (1200 g), 2-ethylhexylacrylate (2400 g), is added Span 40™ (480 g). After mixing, the solution is allowed to settle overnight. The supernatant is withdrawn and used in the oil phase as the emulsifier in forming the HIPE. (Any resulting sticky residue is discarded.)

Separate streams of the oil phase (25° C.) and water phase (42°–44° C.) are fed to a dynamic mixing apparatus. Thorough mixing of the combined streams in the dynamic mixing apparatus is achieved by means of a pin impeller. At this scale of operation, an appropriate pin impeller comprises a cylindrical shaft of about 21.6 cm in length with a diameter of about 1.9 cm. The shaft holds 4 rows of pins, 2 rows having 17 pins and 2 rows having 16 pins, each having a diameter of 0.5 cm extending outwardly from the central axis of the shaft to a length of 1.6 cm. The pin impeller is mounted in a cylindrical sleeve which forms the dynamic mixing apparatus, and the pins have a clearance of 0.8 mm from the walls of the cylindrical sleeve.

A spiral static mixer is mounted downstream from the dynamic mixing apparatus to provide back pressure in the dynamic mixer and to provide improved incorporation of components into the emulsion that is eventually formed. Such a static mixer is 14 inches (35.6 cm) long with a 0.5 inch (1.3 cm) outside diameter. The static mixer is a TAH Industries Model 070-821, modified by cutting off 2.4 inches (6.1 cm).

The combined mixing apparatus set-up is filled with oil phase and water phase at a ratio of 3 parts water to 1 part oil. The dynamic mixing apparatus is vented to allow air to escape while filling the apparatus completely. The flow rates during filling are 1.89 g/sec oil phase and 5.68 cc/sec water phase.

Once the apparatus set-up is filled, agitation is begun in the dynamic mixer, with the impeller turning at 1800 RPM. The flow rate of the water phase is then steadily increased to a rate of 45.4 cc/sec and the oil phase flow rate is reduced to 0.82 g/sec over a time period of about 2 min. The back pressure created by the dynamic and static mixers at this point is 13.4 PSI (92 kPa). The impeller speed is then steadily decreased to a speed of 1200 RPM over a period of 120 sec. The back pressure drops to 5.4 PSI (37 kPa). At this point, the impeller speed is instantly increased to 1800 RPM. The system back pressure increases to 6.5 PSI (44 kPa) and remains constant thereafter. The resultant HIPE has a water-to-oil ratio of about 55:1.

B) Polymerization/Curing of HIPE

The HIPE from the static mixer is collected in a round polypropylene tub, 17 in. (43 cm) in diameter and 7.5 in. (10 cm) high, with a concentric insert made of Celcon plastic. The insert is 5 in. (12.7 cm) in diameter at its base and 4.75 in (12 cm) in diameter at its top and is 6.75 in. (17.14 cm) high. The HIPE-containing tubs are kept in a room maintained at 65° C. for 18 hours to cure and provide a polymeric HIPE foam.

C) Foam Washing and Dewatering

The cured HIPE foam is removed from the tubs. The foam at this point has residual water phase (containing dissolved emulsifiers, electrolyte, initiator residues, and initiator) about 50–60 times (50–60x) the weight of polymerized monomers. The foam is sliced with a sharp reciprocating saw blade into sheets which are 0.2 inches (0.5 cm) in thickness. These sheets are then subjected to compression in a series of 2 porous nip rolls equipped with vacuum which gradually reduces the residual water phase content of the foam to about 6 times (6x) the weight of the polymerized monomers. At this point, the sheets are then resaturated with a water at 60° C., are squeezed in a series of 3 porous nip rolls equipped with vacuum to a water phase content of about 4x. Optionally, the water used to resaturate the foam contains about 1% sodium bicarbonate. This serves to react with any residual calcium chloride that would tend to render the washed foams hydrophilic and form insoluble, non-hygroscopic calcium carbonate. The $CaCl_2$ content of the foam is less than about 1%.

The HIPE foam remains compressed after the final nip at a thickness of about 0.019 in. (0.048 cm). The foam is then dried in air for about 16 hours. Such drying reduces the moisture content to about 1–8% by weight of polymerized material. In the compressed state, the density of the foam is about 0.14 g/cc. When expanded, the foam has a dry density of about 0.018 g/cc and has a glass transition temperature of 50° C.

EXAMPLE 2

Preparation of Foam from a HIPE

A) HIPE Preparation

Anhydrous calcium chloride (36.32 kg) and potassium persulfate (189 g) are dissolved in 378 L of water. This provides the water phase stream to be used in a continuous process for forming the HIPE.

To a monomer combination comprising distilled divinylbenzene (40% divinylbenzene and 60% ethyl styrene) (2100 g), 2-ethylhexylacrylate (3300 g), and hexanediol diacrylate (600 g) is added a very high purity diglycerol monooleate (360 g), and Tinuvin 765 (30 g). The diglycerol monooleate emulsifier (Grindsted Products; Brabrand, Denmark) comprises approximately 81% diglycerol monooleate, 1% other diglycerol monoesters, 3% polyglycerols, and 15% other polyglycerol esters, imparts a minimum oil phase/water phase interfacial tension value of approximately 2.5 dyne/cm and has a critical aggregation concentration of approximately 2.9 wt %. After mixing, this emulsifier mixture is allowed to settle overnight. No visible residue is formed and all of the mix is withdrawn and used in the oil phase as the emulsifier in forming the HIPE.

Separate streams of the oil phase (25° C.) and water phase (53°–55° C.) are fed to a dynamic mixing apparatus as in Example 1. A portion of the material exiting the dynamic mixing apparatus is withdrawn and recirculated by a recirculation loop as shown and described in the Figure of copending U.S. application Ser. No. 08/370,694, filed Jan. 10, 1995 by DesMarais et al., to the entry point of the oil and water phase flow streams to the dynamic mixing zone.

The combined mixing and recirculation apparatus is filled with oil phase and water phase at a ratio of 3 parts water to 1 part oil. The dynamic mixing apparatus is vented to allow air to escape while filling the apparatus completely. The flow rates during filling are 3.78 g/sec oil phase and 11.35 cc/sec water phase with about 15 cc/sec in the recirculation loop.

Once the apparatus set-up is filled, the water phase flow rate is cut in half to reduce the pressure build up while the vent is closed. Agitation is then begun in the dynamic mixer, with the impeller turning at 1800 RPM. The flow rate of the water phase is then steadily increased to a rate of 45.4 cc/sec over a time period of about 1 min., and the oil phase flow rate is reduced to 0.757 g/sec over a time period of about 2 min. The recirculation rate is steadily increased to about 45 cc/sec during the latter time period. The back pressure created by the dynamic and static mixers at this point is about 10 PSI (69 kPa). The Waukesha pump speed is then steadily decreased to a yield a recirculation rate of about 11 cc/sec.

B) polymerization/Curing of HIPE

The formed emulsion flowing from the static mixer at this point is collected in a round polypropylene tub, 17 in. (43 cm) in diameter and 7.5 in (10 cm) high, with a concentric insert made of Celcon plastic. The insert is 5 in (12.7 cm) in diameter at its base and 4.75 in (12 cm) in diameter at its top and is 6.75 in (17.14 cm) high. The emulsion-containing tubs are kept in a room maintained at 65° C. for 18 hours to bring about polymerization of the emulsion in the containers to thereby form polymeric foam.

C) Foam Washing and Dewatering

The cured HIPE foam is removed from the tubs. The foam at this point has residual water phase (containing dissolved emulsifiers, electrolyte, initiator residues, and initiator) about 50–60 times (50–60x) the weight of polymerized monomers. The foam is sliced with a sharp reciprocating saw blade into sheets which are 0. 160 inches (0.406 cm) in thickness. These sheets are then subjected to compression in a series of 2 porous nip rolls equipped with vacuum which gradually reduce the residual water phase content of the foam to about 6 times (6x) the weight of the polymerized material. At this point, the sheets are then resaturated with 60° C., are squeezed in a series of 3 porous nip rolls equipped with vacuum to a water phase content of about 4x. The $CaCl_2$ content of the foam is less than 1%.

The foam remains compressed after the final nip at a thickness of about 0.021 in. (0.053 cm). The foam is then dried in air for about 16 hours. Such drying reduces the moisture content to about 9–17% by weight of polymerized material. At this point, the foam sheets are very drapeable. The foam also contains about 5% by weight of residual diglycerol monooleate emulsifier. In the collapsed state, the density of the foam is about 0.14 g/cc. When expanded this foam has a dry density of about 0.018 g/cc and has a glass transition temperature of about 23° C.

EXAMPLES 3–11

Preparation of HIPE Foams From Different Monomers

Absorbent foams are prepared from HIPEs having varying monomer components using procedures similar to those described in Examples 1 and 2 above. The monomer formulations, water-to-oil (W:O) ratios, and resulting Tg are shown in Table 1.

TABLE 1

| | Foam Composition and Tg. | | | |
|---|---|---|---|---|
| Example # | STY % | DVB % | EHA % | Tg (°C.)* |
| 3 | 40% | 22% | 38% | 52° |
| 4 | 34% | 22% | 44% | 44° |
| 5 | 32% | 24% | 44% | 50° |
| 6 | 31% | 22% | 47% | 38° |
| 7 | 29% | 24% | 47% | 41° |
| 8 | 25% | 22% | 53% | 32° |
| 9 | 38% | 22% | 40% | 54° |
| 10 | 36% | 22% | 42% | 49° |
| 11 | 28% | 22% | 50% | 30° |

STY = styrene; available from Aldrich Chemical Corp.
DVB = divinyl benzene, based on 55% purity with 45% ethyl styrene impurity; available from Dow Chemical Corp.
EHA = 2-ethylhexyl acrylate; available from Aldrich Chemical Corp.
*Determined via Dynamic Mechanical Analysis at 1.0 radians/second.

EXAMPLES 12–16

Preparation of HIPE Foams From Different Monomers

Additional foams of the present invention were prepared essentially as described in Example 1. The insulating properties of these foams were measured via ASTM $C_{177}$-85. The results are shown in Table 2.

TABLE 2

| | Insulating Values for Foams. | | | | | |
|---|---|---|---|---|---|---|
| Example # | Density g/cc | STY % | DVB % | EHA % | Tg (°C.) | Thermal Conductivity* |
| 12 | 0.011 | 20% | 40%ᵃ | 40% | 60° | 38 |
| 13 | 0.012 | 20% | 40% | 40% | 60° | 34 |
| 14 | 0.008 | 0% | 40%ᵇ | 60% | ~18° | 37 |
| 15ᶜ | 0.015 | 0% | 33% | 55% | ~23° | 34 |
| 16ᶜ | 0.012 | 0% | 33% | 55% | ~23° | 35 |

(**Calculated using DMA)
(**Units are mW/(m · K). Calculated using ASTM C177-85)
ᵃ55% pure DVB was used
ᵇ50% pure DVB was used
ᶜ12% 1,6-hexanedioldiacrylate was used
The data show excellent thermal insulating properties for the foams of the current invention.

EXAMPLE 17

A continuous sheet of foam 12" wide and 3" thick is prepared from a HIPE comprising 40% styrene, 20% DVB, and 40% EHA at a water-to-oil ratio of 50:1 by the process described in Example 1. This foam is dewatered while warm (ca. 40° C.) by passing through compressive dewatering nip rolls with successive gaps of 2", 1", 0.5", and 0.3". The foam slice retains a thickness at that stage of about 0.5". The continuous foam slice is then laminated to a 0.01" thick aluminum foil and rolled into a bail about 2.5' in diameter. This is then packaged in shrink wrap plastic. The foam remains stable in this configuration through warehousing, shipping, retail display, and application. Application takes the form of unrolling the product and inserting it between ceiling joists in a residential attic to the desired cut lengths. The product at that point is still about 0.5" in thickness. The elevated temperature in the attic causes a fairly rapid reexpansion to the original thickness and density, 3" and 0.020 g/cc respectively, of the foam. This serves as an excellent insulating material, conveniently managed from manufacturer to final rise.

What is claimed is:

1. A method of insulating an object, comprising locating a polymeric foam material proximate to the object, wherein the polymeric foam material has:

A) s specific surface area per foam volume of at least about 0.01 m/cc;

B) a dry density of less than about 0.05 g/cc; and

C) a glass transition temperature (Tg) of between about −20° and 90° C.;

and wherein the polymeric foam material is prepared by the process comprising the steps of (A) forming a water-in-oil emulsion at a temperature of about 30° C. or higher and under low shear mixing from:

(1) an oil phase comprising:

(a) from about 80% to about 98% by weight of a monomer component capable of forming a copolymer having a Tg value of from about −20° C. to about 90° C., said monomer component comprising:

(i) from about 10% to about 70% by weight of a substantially water-insoluble, monofunctional monomer capable of forming a homopolymer having a Tg of about 35° C. or less;

(ii) from about 10% to about 70% by weight of a substantially water-insoluble, monofunctional comonomer capable of imparting toughness about equivalent to that provided by styrene;

(iii) from about 2% to about 50% of a first substantially water-insoluble, polyfunctional crosslinking agent selected from the group consisting of divinyl benzene and analogs thereof; and (iv) from about 0% to about 15% of a second substantially water-insoluble, polyfunctional crosslinking agent selected from the group consisting of diacrylates of diols and analogs thereof; and (b) from about 2% to about 20% by weight of an emulsifier component which is soluble in the oil phase and which is suitable for forming a stable water-in-oil emulsion;

(2) a water phase comprising from about 0.1% to about 20% by weight of a water-soluble electrolyte; and (3) a volume to weight ratio of water phase to oil phase in the range of from about 12:1 to about 250:1; and (B) polymerizing the monomer component in the oil phase of the water-in-oil emulsion to form the polymeric foam material.

2. The method according to claim 1, wherein the process for preparing the polymeric foam material further comprises the step of dewatering the foam material obtained in step (B).

3. The method according to claim 1, wherein the monomer component used in step (A) comprises from about 10% to about 70% monofunctional comonomer (ii).

4. The method according to claim 3, wherein the monomer component used in step (A) comprises from about 20% to about 50% monofunctional comonomer (ii).

5. The method according to claim 3, wherein the monomer component used in step (A) comprises from about 20% to about 50% monofunctional monomer (i).

6. The method according to claim 3, wherein the monomer component used in step (A) comprises from about 10% to about 30% crosslinking agent (iii).

7. The method according to claim 3, wherein monofunctional monomer (i) of the monomer component is selected from the group consisting of 2-ethylhexyl acrylate, isodecyl acrylate, lauryl acrylate, and lauryl methacrylate.

8. The method according to claim 3, wherein monofunctional comonomer (ii) of the monomer component is selected from the group consisting of styrene, ethyl styrene, and p-n-octylstyrene.

9. The method according to claim 3, wherein the first crosslinking agent (iii) of the monomer component is selected from the group consisting of divinylbenzene, trivinylbenzene, divinyltoluene, and divinylxylene.

10. The method according to claim 1, wherein the volume to weight ratio of water phase to oil phase is in the range of from about 25:1 to about 125:1.

11. The method according to claim 1, wherein the polymeric foam material is prepared by the process comprising the steps of (A) forming a water-in-oil emulsion at a temperature of about 35° C. or higher and under low shear mixing from:
  (1) an oil phase comprising:
    (a) from about 80% to about 98% by weight of a monomer component capable of forming a copolymer having a Tg value of from about −20° C. to about 90° C., said monomer component comprising:
      (i) from about 10% to about 70% by weight of a substantially water-insoluble, monofunctional monomer capable of forming a homopolymer having a Tg of about 35° C. or less;
      (ii) from about 10% to about 70% by weight of a substantially water-insoluble, monofunctional comonomer capable of imparting toughness about equivalent to that provided by styrene;
      (iii) from about 2% to about 50% of a first substantially water-insoluble, polyfunctional crosslinking agent selected from the group consisting of divinyl benzene and analogs thereof; and
      (iv) from about 0% to about 15% of a second substantially water-insoluble, polyfunctional crosslinking agent selected from the group consisting of diacrylates of diols and analogs thereof, and
    (b) from about 2% to about 20% by weight of an emulsifier component which is soluble in the oil phase and which is suitable for forming a stable water-in-oil emulsion;
  (2) a water phase comprising from about 0.1% to about 20% by weight of a water-soluble electrolyte; and
  (3) a volume to weight ratio of water phase to oil phase in the range of from about about 25:1 to about 125:1; and (B) polymerizing the monomer component in the oil phase of the water-in-oil emulsion to form the polymeric foam material.

* * * * *

UNITED STATES PATENT AND TRADEMARK OFFICE
CERTIFICATE OF CORRECTION

PATENT NO. :   5,633,291

DATED        :   May 27, 1997

INVENTOR(S) :   J. C. Dyer et al.

It is certified that error appears in the above-identified patent and that said Letters Patent is hereby corrected as shown below:

In Col. 2, line 41, "et at" should read --et al--.

In Col. 5, line 36, "genetic" should read --generic--.

In Col. 6, line 46, "properly" should read --property--.

In Col. 7, line 37, "et at" should read --et al--.

In Col. 13, line 32, "polymerzing" should read --polymerizing--.

In Col. 20, line 5, "s" should read --a--.

In Col. 20, line 6, "m/cc" should read --m$^2$/cc--.

Signed and Sealed this

Thirtieth Day of September, 1997

*Attest:*

BRUCE LEHMAN

*Attesting Officer*   Commissioner of Patents and Trademarks